(12) United States Patent
Wang

(10) Patent No.: US 11,848,482 B2
(45) Date of Patent: Dec. 19, 2023

(54) MOBILE TERMINAL

(71) Applicant: HONOR DEVICE CO., LTD., Shenzhen (CN)

(72) Inventor: Haikun Wang, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 346 days.

(21) Appl. No.: 17/264,736

(22) PCT Filed: Jul. 30, 2019

(86) PCT No.: PCT/CN2019/098313
§ 371 (c)(1),
(2) Date: Jan. 29, 2021

(87) PCT Pub. No.: WO2020/024928
PCT Pub. Date: Feb. 6, 2020

(65) Prior Publication Data
US 2021/0305682 A1    Sep. 30, 2021

(30) Foreign Application Priority Data
Jul. 31, 2018  (CN) .......................... 201810856158.7

(51) Int. Cl.
| H01Q 1/24 | (2006.01) |
| H01Q 1/36 | (2006.01) |
| H01Q 1/44 | (2006.01) |
| H01Q 1/48 | (2006.01) |
| H04B 5/00 | (2006.01) |

(52) U.S. Cl.
CPC ............... *H01Q 1/243* (2013.01); *H01Q 1/36* (2013.01); *H01Q 1/44* (2013.01); *H01Q 1/48* (2013.01); *H04B 5/0075* (2013.01)

(58) Field of Classification Search
CPC ............ H01Q 1/243; H01Q 1/44; H01Q 1/48
See application file for complete search history.

(56) References Cited

U.S. PATENT DOCUMENTS

| 8,537,055 B2 | 9/2013 | Waku et al. |
| 9,477,859 B2 | 10/2016 | Lefevre et al. |
(Continued)

FOREIGN PATENT DOCUMENTS

| CN | 102460832 A | 5/2012 |
| CN | 104167592 A | 11/2014 |
(Continued)

*Primary Examiner* — Ricardo I Magallanes
(74) *Attorney, Agent, or Firm* — Leydig, Voit & Mayer, Ltd.

(57) ABSTRACT

A mobile terminal, including an NFC antenna. The NFC antenna includes a feed, an inductor and a capacitor that are connected in parallel to the feed. The NFC antenna includes one or more of a first distributed inductor, a second distributed inductor, a third distributed inductor, and a fourth distributed inductor. The first distributed inductor is located between the feed and the inductor, the second distributed inductor is located between the inductor and a first ground point, the third distributed inductor is located between the feed and the capacitor, and the fourth distributed inductor is located between the capacitor and a second ground point. The inductor includes a lumped inductor and a metal segment connected to the lumped inductor in series.

11 Claims, 5 Drawing Sheets

(56) References Cited

U.S. PATENT DOCUMENTS

| | | | |
|---|---|---|---|
| 10,917,137 B2* | 2/2021 | Antonetti | H04B 5/0056 |
| 11,329,374 B2* | 5/2022 | Li | H01Q 1/48 |
| 2004/0124961 A1* | 7/2004 | Aoyagi | H01F 5/00 |
| | | | 336/200 |
| 2008/0081631 A1 | 4/2008 | Rofougaran | |
| 2010/0277383 A1* | 11/2010 | Autti | H01Q 5/335 |
| | | | 343/749 |
| 2011/0012793 A1 | 1/2011 | Amm et al. | |
| 2012/0068898 A1 | 3/2012 | Clow et al. | |
| 2014/0015719 A1* | 1/2014 | Ramachandran | H01Q 1/243 |
| | | | 343/745 |
| 2014/0139380 A1* | 5/2014 | Ouyang | H01Q 9/0421 |
| | | | 343/702 |
| 2015/0249292 A1* | 9/2015 | Ouyang | H01Q 7/00 |
| | | | 343/702 |
| 2015/0249485 A1* | 9/2015 | Ouyang | H01Q 9/42 |
| | | | 455/552.1 |
| 2015/0303568 A1* | 10/2015 | Yarga | H01Q 5/321 |
| | | | 343/722 |
| 2016/0197401 A1* | 7/2016 | Ouyang | H01Q 1/243 |
| | | | 343/724 |
| 2018/0123221 A1 | 5/2018 | Finn et al. | |
| 2019/0081396 A1* | 3/2019 | Zhou | H05K 5/0247 |
| 2019/0372201 A1* | 12/2019 | Zhu | H04B 5/0075 |
| 2021/0242908 A1* | 8/2021 | Gommé | H04B 5/0012 |

FOREIGN PATENT DOCUMENTS

| | | |
|---|---|---|
| CN | 204442449 U | 7/2015 |
| CN | 204481122 U | 7/2015 |
| CN | 204760528 U | 11/2015 |
| CN | 105703790 A | 6/2016 |
| CN | 105940550 A | 9/2016 |
| CN | 106067588 A | 11/2016 |
| CN | 206163707 U | 5/2017 |
| CN | 207542404 U | 6/2018 |
| CN | 108321542 A | 7/2018 |
| KR | 20100074541 A | 7/2010 |
| WO | WO 2008105477 A1 | 9/2008 |
| WO | WO 2013182778 A1 | 12/2013 |

\* cited by examiner

MOBILE TERMINAL

CROSS-REFERENCE TO RELATED APPLICATIONS

This application is a National Stage of International Application No. PCT/CN2019/098313, filed on Jul. 30, 2019, which claims priority to Chinese Patent Application No. 201810856158.7, filed on Jul. 31, 2018, both of which are hereby incorporated by reference in their entireties.

TECHNICAL FIELD

This application relates to the field of communications technologies, and in particular, to a mobile terminal.

BACKGROUND

Currently, with rapid development of intelligent terminals (such as mobile phones and tablet computers), an NFC function becomes increasingly popular. The NFC function is a card emulation mode (that is, used as an IC card such as a credit card or a bus card), a card reader mode, and a point-to-point mode (that is, used for data exchange between terminals, and similar to Bluetooth). Therefore, after the NFC function is enabled, the intelligent terminal may face many IC cards and POS machines, and needs to have relatively good performance for compatibility. In the prior art, an inductor in an NFC antenna uses a metal frame, and performance of the NFC antenna completely depends on a diversity-based shared part (a metal frame). However, due to a limitation in a solution of diversity with another antenna, a length of the conformal NFC antenna is limited, and consequently, the performance of the NFC antenna is relatively poor.

SUMMARY

This application provides a mobile terminal, to improve performance of an NFC antenna in a mobile terminal.

According to a first aspect, a mobile terminal is provided. The mobile terminal includes an NFC antenna, the NFC antenna includes a feed, and an inductor and a capacitor that are connected in parallel and that are connected to the feed, and the inductor includes a lumped inductor and a segment of metal frame connected to the lumped inductor in series. In addition, the NFC antenna further includes one or more of a first distributed inductor, a second distributed inductor, a third distributed inductor, and a fourth distributed inductor. The first distributed inductor is located between the feed and the inductor, the second distributed inductor is located between the inductor and a first ground point, the third distributed inductor is located between the feed and the capacitor, the fourth distributed inductor is located between the capacitor and a second ground point, and the inductor includes a lumped inductor and a first metal segment connected to the lumped inductor in series. In this way, a loop area of the NFC antenna is increased by using the distributed inductor, thereby increasing a magnetic flux and coupling energy, and improving performance of the NFC antenna.

The first distributed inductor, the second distributed inductor, the third distributed inductor, or the fourth distributed inductor includes a metal wire on a flexible circuit board, a metal wire on a printed circuit board, or a segment of metal frame of the mobile terminal.

In addition, the mobile terminal further includes a first antenna, and the first antenna includes a first radiation branch and/or a second radiation branch. The first antenna and the NFC antenna are antennas sharing a same part. The mobile terminal further includes a metal frame, and the metal frame includes at least a second metal segment and a third metal segment. The second metal segment is the first radiation branch of the first antenna, the third metal segment is the second radiation branch of the first antenna, and a first metal segment of the inductor is at least a part of the second metal segment or the third metal segment. A segment of metal frame of the inductor and the first radiation branch or the second radiation branch form an integrated structure, so that the NFC antenna and the first antenna are antennas sharing a same part.

In some embodiments, when the first antenna includes the first radiation branch and the second radiation branch, and the NFC antenna includes the second distributed inductor, the first metal segment of the inductor is at least a part of the second metal segment, and the second distributed inductor is the metal wire on the flexible circuit board or the metal wire on the printed circuit board that is connected to the first radiation branch in series.

Alternatively, the NFC antenna and the first antenna may share a structure. For example, when the first antenna includes the first radiation branch and the second radiation branch, and the NFC antenna includes the second distributed inductor, the first metal segment of the inductor is at least a part of the second metal segment, and the second distributed inductor is the metal wire on the flexible circuit board or the metal wire on the printed circuit board that is connected to the first radiation branch in series.

Alternatively, the first antenna includes the first radiation branch and the second radiation branch, the first metal segment of the inductor is at least a part of the second metal segment, and when the NFC antenna includes the fourth distributed inductor, the fourth distributed inductor is at least a part of the third metal segment.

Alternatively, the first antenna may include the first radiation branch and the second radiation branch; and the first metal segment of the inductor is at least a part of the third metal segment, and when the NFC antenna includes the fourth distributed inductor, the fourth distributed inductor is at least a part of the second metal segment.

In the foregoing several different implementations, a radiation branch of the first antenna is used as a distributed inductor, so that a loop area of the NFC antenna is increased without enlarging a structure of the entire antenna.

In addition to the foregoing several implementations, when the first antenna includes the first radiation branch and the second radiation branch, the first metal segment of the inductor is at least a part of the second metal segment, and when the NFC antenna includes the fourth distributed inductor, there are two fourth distributed inductors, one fourth distributed inductor is at least a part of the third metal segment, and the other fourth distributed inductor is connected to the ground. The fourth distributed inductor connected to the ground is the metal wire on the flexible circuit board or the metal wire on the printed circuit board that is connected to the third metal segment in series. In some embodiments, the performance of the NFC antenna is improved by using a radiation branch and the fourth distributed inductor connected in series.

To avoid signal crosstalk, in some embodiments, the NFC antenna further includes a selection circuit, where the selection circuit includes a low-cut filter and a high-cut filter that are connected in parallel, one end of the low-cut filter and one end of the high-cut filter are connected to the capacitor, and the other end of the low-cut filter and the other end of the high-cut filter are connected to the fourth distributed inductor that is not connected to the ground.

In some embodiments, the high-cut filter is an inductor, and the low-cut filter is a capacitor. Low-frequency signals can be well isolated by the capacitor, and high-frequency signals can be well isolated by the inductor.

In some embodiments, different structures may be used for implementation. For example, the distributed inductor is the metal wire on the flexible circuit board, the metal wire on the printed circuit board, or the metal frame of the mobile terminal.

According to a second aspect, a mobile terminal is provided. The mobile terminal includes a metal frame, and the metal frame includes at least a second metal segment and a third metal segment. The mobile terminal further includes a first antenna, where the first antenna includes a first radiation branch and a second radiation branch, the second metal segment is the first radiation branch of the first antenna, and the third metal segment is the second radiation branch of the first antenna. The mobile terminal further includes an NFC antenna, where the NFC antenna includes a feed, and an inductor and a capacitor that are connected in parallel, the feed is connected to the inductor and the capacitor that are connected in parallel, one end of the inductor is connected to the ground through a first ground point, and one end of the capacitor is connected to the ground through a second ground point. The NFC antenna further includes a distributed inductor. The inductor includes a lumped inductor and a first metal segment connected to the lumped inductor in series, the first metal segment is at least a part of the second metal segment, and the distributed inductor is at least a part of the third metal segment.

In some embodiments, a selection circuit is further included, where the selection circuit includes a low-cut filter and a high-cut filter that are connected in parallel, one end of the low-cut filter and one end of the high-cut filter are both connected to the capacitor, and the other end of the low-cut filter and the other end of the high-cut filter are both connected to the distributed inductor. Therefore, signal crosstalk is avoided.

DESCRIPTION OF EMBODIMENTS

To make the objectives, technical solutions, and advantages of the present disclosure more clear, the following further describes the present disclosure in detail with reference to the accompanying drawings. The described embodiments are merely example rather than all of the embodiments of the present disclosure. All other embodiments obtained by a person of ordinary skill in the art based on the embodiments of the present disclosure without creative efforts shall fall within the protection scope of the present disclosure.

To facilitate understanding of a mobile terminal provided in the embodiments of this application, the following first describes the mobile terminal provided in the embodiments of this application. The mobile terminal is a mobile terminal such as a mobile phone or a tablet computer, and the mobile terminal has an antenna such as an NFC antenna, and further has a first antenna such as a GPS antenna, a Wi-Fi antenna, a main antenna, or a diversity antenna. In addition, during disposing, the first antenna and the NFC antenna are antennas sharing a same part. To improve communication performance of the mobile terminal provided in the embodiments of this application, the embodiments of this application provide the mobile terminal.

Figure 1:
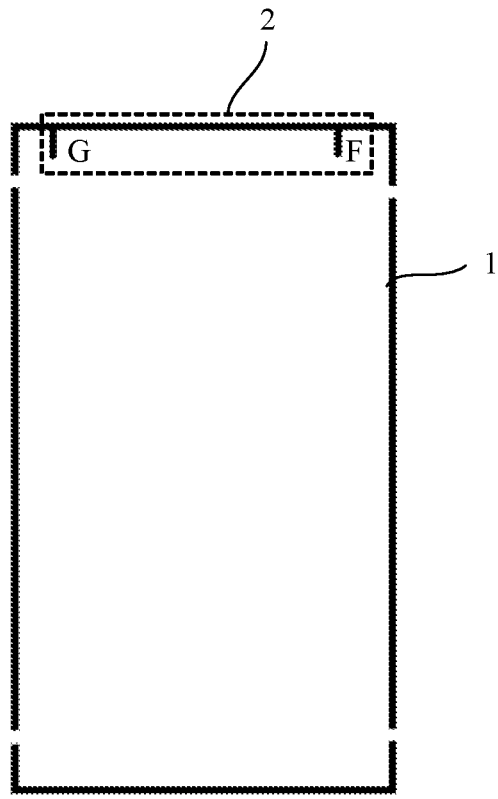
FIG. 1 is a schematic structural diagram of a conventional NFC antenna.
Figure 2:
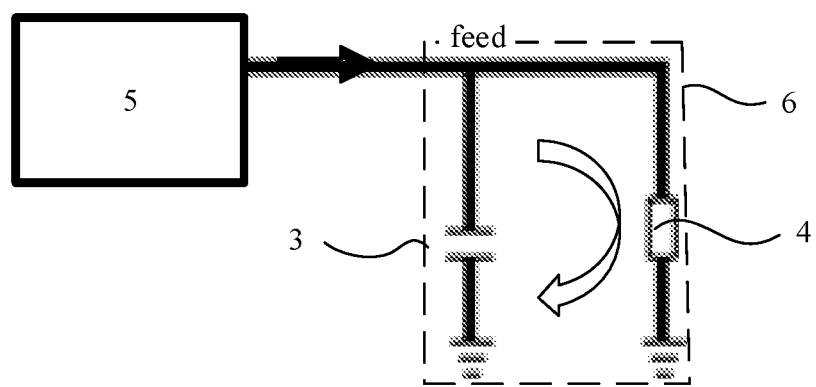
FIG. 2 is a principle diagram of a conventional NFC antenna.

To facilitate understanding of the NFC antenna of the mobile terminal provided in the embodiments of this application, a principle of the NFC antenna is described first. Referring to FIG. 1 and FIG. 2 first, as shown in FIG. 2, an NFC antenna 2 includes an oscillation circuit 6, and a part of the oscillation circuit is disposed on a metal frame 1. The oscillation circuit 6 is connected to a chip 5, and the oscillation circuit includes a capacitor 3 and an inductor 4 that are connected in parallel and that form LC parallel resonance. A formula is as follows: $\Phi=BS$, where $\varphi$ is a magnetic flux, B is a magnetic flux density, and S is an area of a surface through which a magnetic induction line passes. The magnetic flux can be improved by changing values of B and S. However, B is determined and adjusted by the chip, and an adjustment amplitude is limited. Therefore, when B is fixed, $\varphi$ can be improved only by increasing S. Therefore, to improve the mobile terminal provided in the embodiments of this application, the NFC antenna of the mobile terminal is improved.

Figure 3:
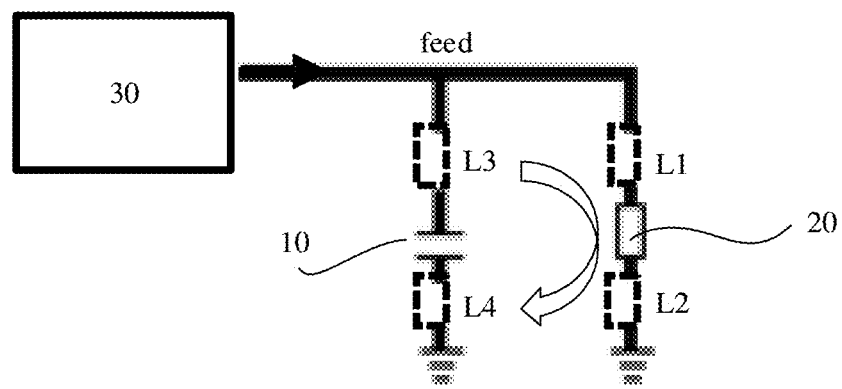
FIG. 3 is a principle diagram of an NFC antenna, in accordance with one or more embodiments.

As shown in FIG. 3, in the NFC antenna provided in the embodiments of this application, a lumped inductor is changed to distributed inductors, to increase a loop area, that is, increase the value of S, so as to increase the magnetic flux, thereby increasing coupling energy, and improving performance of the NFC antenna.

Still referring to FIG. 3, the NFC antenna in the embodiments of this application includes a feed, and a capacitor 10 and an inductor 20 that are connected in parallel. In addition, one end of the capacitor 10 and one end of the inductor 20 are connected to the feed, and the other end of the capacitor 10 and the other end of the inductor 20 are connected to the ground. In this way, the capacitor 10 and the inductor 20 form a parallel resonance loop. The resonance loop is connected to a chip 30 and is configured to generate a magnetic flux. In addition, the resonance loop performs energy coupling with an external coil card to complete communication. To improve performance of the antenna, distributed inductors are added to the NFC antenna in the embodiments of this application. For ease of description, in the embodiments of this application, the distributed inductors are classified into a first distributed inductor, a second distributed inductor, a third distributed inductor, and a fourth distributed inductor. The first distributed inductor is located between the feed and the inductor, the second distributed inductor is located between the inductor and a first ground point, the third distributed inductor is located between the feed and the capacitor, and the fourth distributed inductor is located between the capacitor and a second ground point. In addition, a quantity of first distributed inductors, second distributed inductors, third distributed inductors, or fourth distributed inductors is not limited, and there may be one or more (including two or more) first distributed inductors, second distributed inductors, third distributed inductors, or fourth distributed inductors. Only a number between 1~4 of the first distributed inductor, the second distributed inductor, the third distributed inductor, and the fourth distributed inductor is/are used. For example, only the first distributed inductor is used, only the first distributed inductor and the second distributed inductor are used, or there may be other different cases.

As shown in FIG. 3, there are four distributed inductors: L1, L2, L3, and L4. L1 and L2 are connected to the inductor 20 in series, and L3 and L4 are connected to the capacitor 10 in series. The inductor 20 is connected to the feed through L1 and is connected to the ground through L2. The capacitor 10 is connected to the feed through L3 and is connected to the ground through L4. L1 is the first distributed inductor, L2 is the second distributed inductor, L3 is the third distributed inductor, and L4 is the fourth distributed inductor. In some embodiments, a value of the inductor 20 may be reduced, and L1, L2, L3, or L4 is separated in a form of a distributed inductor. Alternatively, a value of the inductor 20 may be kept unchanged, and the distributed inductor L1, L2, L3, or L4 is added around the inductor 20 or the capacitor 10 to increase a loop area, so as to increase a magnetic flux, thereby increasing coupling, and improving communication quality. In some embodiments, the distributed inductors L1, L2, L3, and L4 may be implemented in a form of metal wires on a flexible circuit board, metal wires on a printed circuit board, or metal frames of the mobile terminal. It should be understood that a quantity of distributed inductors is not limited to that shown in FIG. 3. There may be one distributed inductor, two distributed inductors, three distributed inductors, five distributed inductors, or a different quantity of distributed inductors. In some embodiments, the distributed inductors may be connected in the resonance loop based on a requirement, and are not limited to the structure shown in FIG. 3. Moreover, different manners may be selected when the distributed inductors are included. The distributed inductors may be located on one side of each of the inductor 20 and the capacitor 10, or may be located on two sides of each of the inductor 20 and the capacitor 10.

To facilitate understanding of the NFC antenna provided in the embodiments of this application, the following describes the NFC antenna with reference to an example embodiment. First, it should be noted that the mobile terminal in the embodiments of this application includes the NFC antenna and a first antenna, and the first antenna is the foregoing GPS antenna or Wi-Fi antenna. In addition, the first antenna includes a first radiation branch and a second radiation branch coupled to the first radiation branch, and the coupling is indirect coupling. For example, there is a gap between the first radiation branch and the second radiation branch, and the first radiation branch and the second radiation branch are coupled through the gap. Alternatively, the first antenna may include only the first radiation branch, or include only the second radiation branch.

In the following embodiments, distributed inductors are not classified into the first distributed inductor, the second distributed inductor, the third distributed inductor, and the fourth distributed inductor. In descriptions of the following accompanying drawings, a distributed inductor 50 may be the first distributed inductor, the second distributed inductor, the third distributed inductor, or the fourth distributed inductor. In addition, the first distributed inductor, the second distributed inductor, the third distributed inductor, or the fourth distributed inductor provided in the embodiments of this application includes a metal wire on a flexible circuit board, a metal wire on a printed circuit board, or a segment of metal frame of the mobile terminal. For example, the first distributed inductor may be a metal wire on a printed circuit board, and the second distributed inductor may be a segment of metal frame. Alternatively, when there are a plurality of fourth distributed inductors, one fourth distributed inductor is a metal wire on a printed circuit board, and another fourth distributed inductor is a segment of metal frame.

For ease of description, a metal frame structure of the mobile terminal is first described. A frame of the mobile terminal provided in the embodiments of this application is a metal frame, a plurality of gaps are disposed on the metal frame to divide the metal frame into a plurality of metal segments, and different metal segments are used as radiation branches for antennas in the mobile terminal. The plurality of metal segments include at least a second metal segment and a third metal segment. The segment of metal frame of the mobile terminal in the foregoing description refers to one of the plurality of metal segments.

Figure 4:
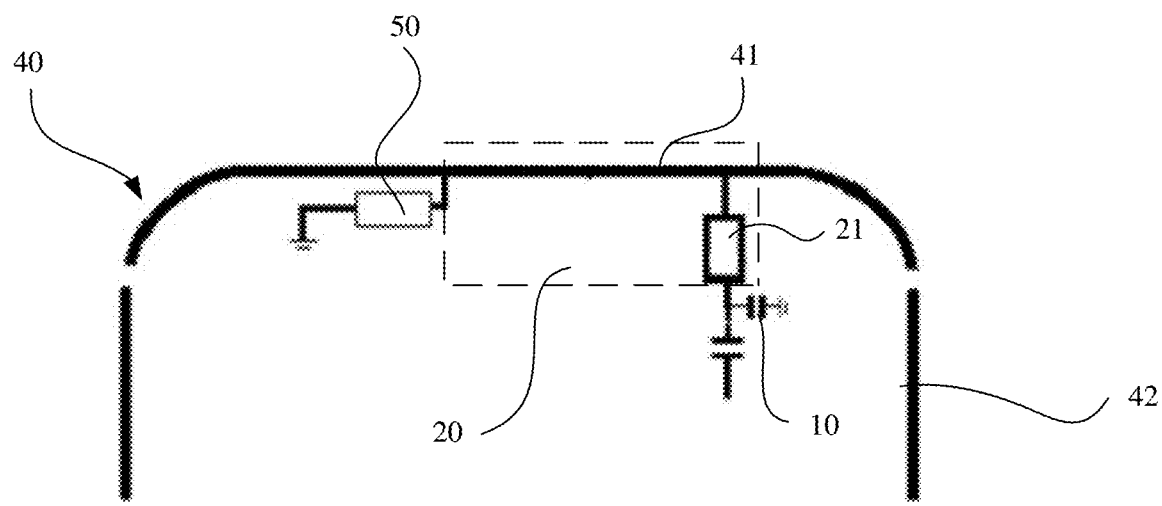
FIG. 4 is a schematic structural diagram of an NFC antenna, in accordance with one or more embodiments.
Figure 5:
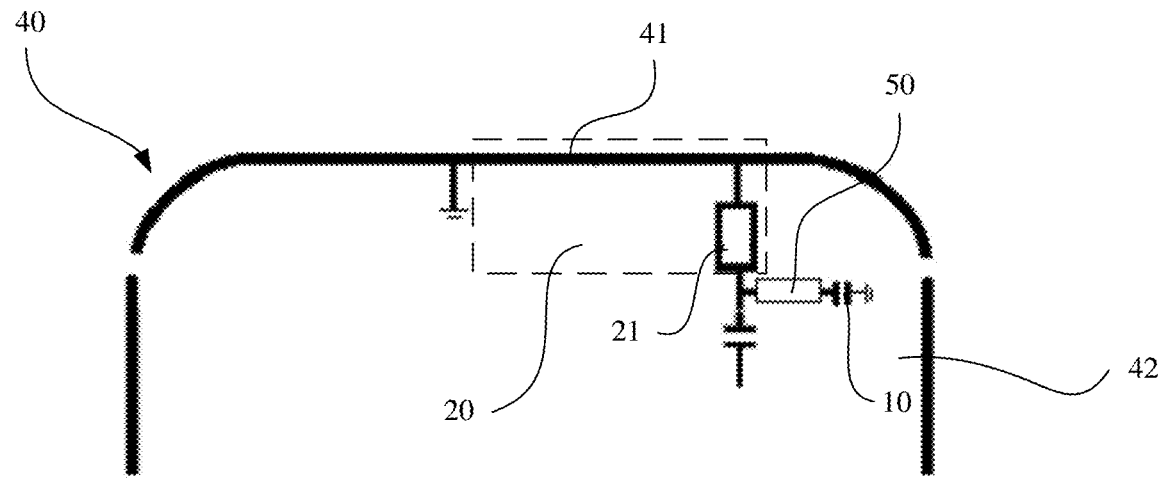
FIG. 5 is a schematic structural diagram of another NFC antenna, in accordance with one or more embodiments.

As shown in FIG. 4, the metal frame 40 includes two gaps, and the metal frame 40 is divided, so that the metal frame 40 includes two metal segments: a second metal segment 41 and a third metal segment 42. The second metal segment 41 is a first radiation branch of a first antenna, and the third metal segment 42 is a second radiation branch of the first antenna. When an NFC antenna is configured as shown in FIG. 4, the NFC antenna includes a capacitor 10, an inductor 20, and a distributed inductor 50. The inductor 20 (such as a structure shown by a dashed-line box in FIG. 4) includes a lumped inductor 21 and a first metal segment connected to the lumped inductor 21 in series. The first metal segment is at least a part of the second metal segment 41. The at least a part of the second metal segment 41 may be all of the second metal segment 41 or a part of the second metal segment 41. The first metal segment shown in FIG. 4 is a part of the second metal segment 41. There is one distributed inductor 50, and the distributed inductor 50 is connected to the inductor 20 in series. In some embodiments, the distributed inductor 50 comprises a metal wire on a flexible circuit board or a metal wire on a printed circuit board. As shown in FIG. 4, one end of the distributed inductor 50 is connected to the first metal segment in the inductor 20, and the other end is connected to the ground. In this case, the distributed inductor 50 may be considered as the second distributed inductor. When the metal wire on the flexible circuit board or the metal wire on the printed circuit board is used, one end of the metal wire on the flexible circuit board or the metal wire on the printed circuit board is connected to the first metal segment, and the other end is connected to the ground. Certainly, when one distributed inductor 50 is used, the distributed inductor 50 may be alternatively connected to the capacitor 10 in series. As shown in FIG. 5, in a structure shown in FIG. 5, the distributed inductor 50 also uses the metal wire on the flexible circuit board or the metal wire on the printed circuit board. In this case, the distributed inductor 50 is the third distributed inductor. It can be learned from FIG. 4 and FIG. 5 that, when one distributed inductor 50 is used, the distributed inductor 50 may be disposed at different positions based on a situation, and the distributed inductor 50 may be any one of the first distributed inductor, the second distributed inductor, the third distributed inductor, or the fourth distributed inductor.

Figure 6:
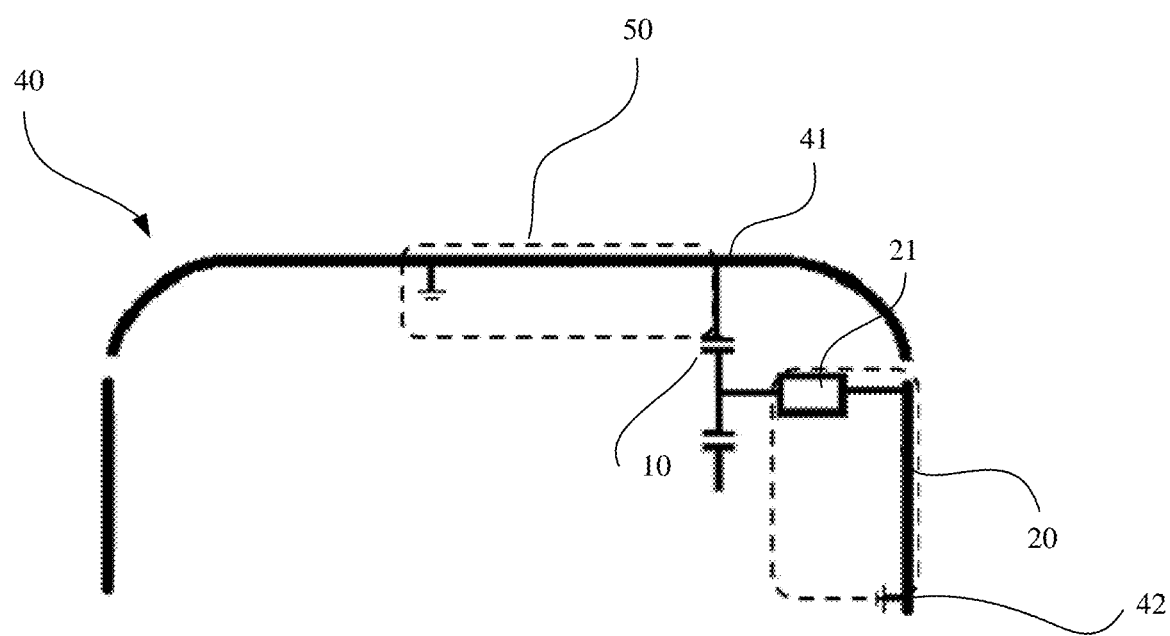
FIG. 6 is a schematic structural diagram of another NFC antenna, in accordance with one or more embodiments.

FIG. 6 shows another manner for disposing a distributed inductor 50. In a structure shown in FIG. 6, a structure of a metal frame 40 is the same as that of the metal frame 40 shown in FIG. 4 and FIG. 5, and details are not described herein again. For a first antenna shown in FIG. 6, the second metal segment 41 is a first radiation branch of the first antenna, and a third metal segment 42 is a second radiation branch of the first antenna. The third metal segment 42 is connected to a feed of the first antenna, and the second metal segment 41 is a coupled branch of the third metal segment 42. When an NFC antenna is configured as shown in FIG. 6, an inductor 20 includes a lumped inductor 21 and a first metal segment connected to the lumped inductor 21 in series, and the first metal segment is at least a part of the third metal segment 42. The distributed inductor 50 is at least a part of the second metal segment 41, and the distributed inductor 50 is connected to a capacitor 10 in series. In this case, the distributed inductor 50 is the fourth distributed inductor. However, during disposing, the structure shown in FIG. 6 constitutes no limitation, and a manner in which the first metal segment of the inductor 20 is at least a part of the second metal segment 41 and the distributed inductor 50 is at least a part of the third metal segment 42 may be alternatively used. A principle thereof is the same as that of the NFC antenna shown in FIG. 6. It can be learned from FIG. 6 that a metal segment on a metal frame may be used as the distributed inductor 50 provided in the embodiments of this application. In this case, a shared part between the NFC antenna and the first antenna includes the second metal segment 41 and the third metal segment 42. At least a part of the second metal segment 41 is used as the distributed inductor 50 of the NFC antenna and the first radiation branch of the first antenna, and at least a part of the third metal segment 42 is used as the second radiation branch and a part of the inductor 20 of the NFC antenna.

Figure 7:
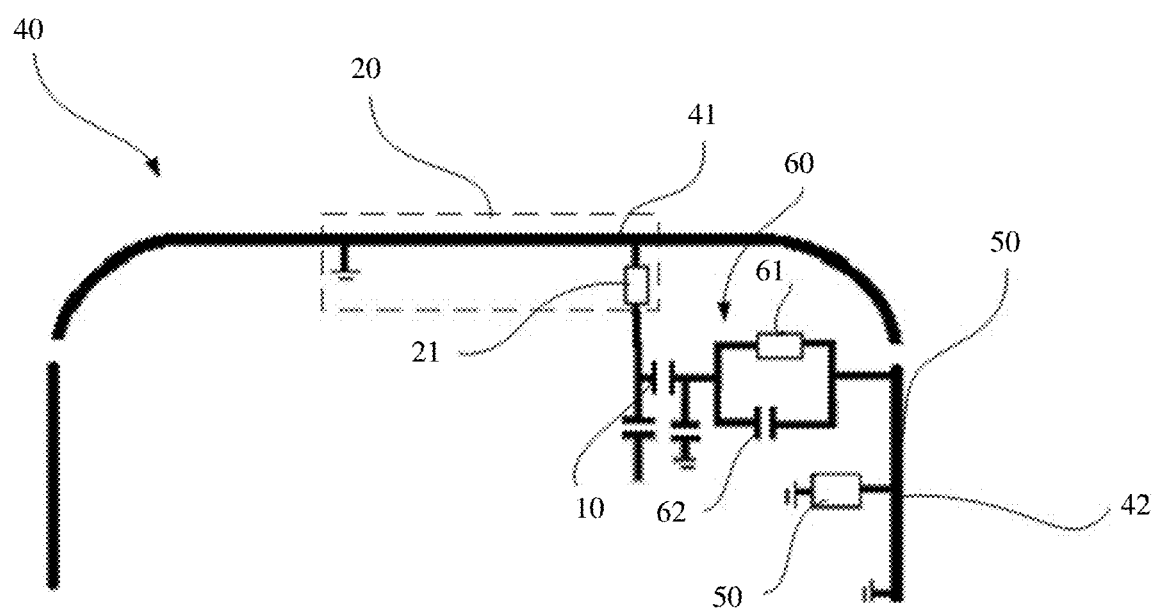
FIG. 7 is a schematic structural diagram of another NFC antenna, in accordance with one or more embodiments.

As shown in FIG. 7, when at least a part of a third metal segment 42 is used as a second radiation branch of a first antenna and a distributed inductor 50 of an NFC antenna, to avoid crosstalk during use, the NFC antenna further includes a selection circuit 60 during disposing, and the selection circuit 60 includes a low-cut filter 62 and a high-cut filter 61 that are connected in parallel. One end of the low-cut filter 62 and one end of the high-cut filter 61 are connected to a capacitor 10, and the other end of the low-cut filter 62 and the other end of the high-cut filter 61 are connected to the distributed inductor 50. In other words, the other end of the low-cut filter 62 and the other end of the high-cut filter 61 are connected to the third metal segment 42. The low-cut filter 62 can isolate a low-frequency signal and allow a high-frequency signal to pass, and may be an inductor. The high-cut filter 61 can isolate a high-frequency signal and allow a low-frequency signal to pass, and may be a capacitor. In an example use process, a frequency band of the NFC antenna is relatively low, and a frequency band of the first antenna is relatively high. Therefore, during use, a signal of the first antenna is transmitted to the second radiation branch through the low-cut filter 62, and signal return is avoided by using the disposed low-cut filter 62; and a signal of the NFC antenna may be transmitted to the second radiation branch through the high-cut filter 61, and signal return is avoided by using the disposed low-cut filter 62, thereby ensuring that a signal can be transmitted to the third metal segment 42 regardless of whether the first antenna or the NFC antenna is used.

Still referring to FIG. 7, to further improve performance of the NFC antenna, the NFC antenna includes two distributed inductors 50. One distributed inductor 50 is at least a part of the third metal segment 42, and the other distributed inductor 50 is connected to the third metal segment 42 (the second radiation branch) in series and is connected to the ground. In addition, the distributed inductor 50 connected to the ground may be a metal wire on a flexible circuit board or a metal wire on a printed circuit board. As shown in FIG. 7, when two distributed inductors 50 are used, the low-cut filter 62 and the high-cut filter 61 are connected to the distributed inductor 50 that is not connected to the ground.

Figure 8:
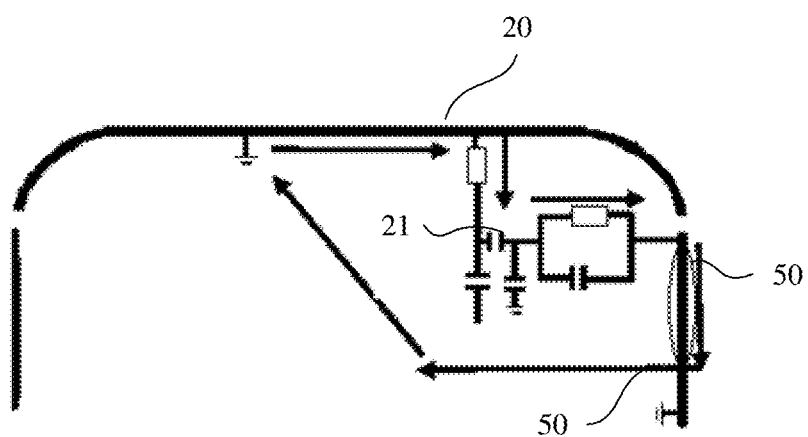
FIG. 8 is a schematic diagram of a current direction of another NFC antenna, in accordance with one or more embodiments.
Figure 9:
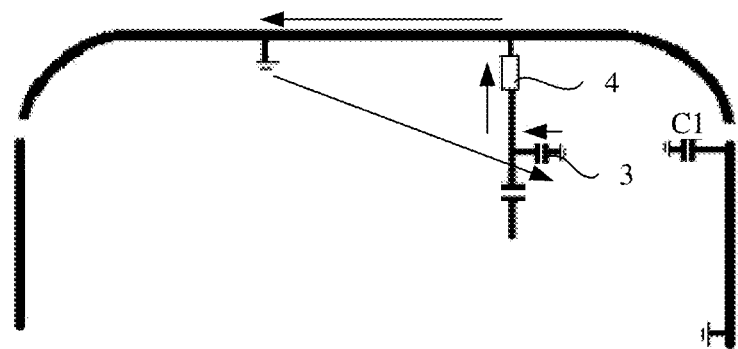
FIG. 9 is a schematic diagram of a current direction of a conventional NFC antenna.

FIG. 8 shows a flow direction of a current. Referring to straight lines with an arrow in FIG. 8, the straight lines with the arrow show the flow direction of the current. When the current flows, a flow path is: ground→inductor 20→capacitor 10→distributed inductor 50→distributed inductor 50→ground. However, a current path of an NFC antenna in the prior art is shown in FIG. 9, and the current path is: ground→capacitor 3→inductor 4→ground. When capacitance and inductance in FIG. 8 are equal to those in FIG. 9, because the two distributed inductors added to the NFC antenna provided in the embodiments of this application increase a loop area of the NFC antenna, a magnetic flux increases, thereby increasing coupling energy, and improving performance of the NFC antenna.

Certainly, FIG. 7 shows a structure in which a part of the third metal segment 42 is used as the second radiation branch of the first antenna and the distributed inductor 50 of the NFC antenna. However, during actual disposing, a structure in which the third metal segment 42 is used as a first radiation branch of the first antenna may be alternatively used, and a principle thereof is similar to the foregoing principle. Details are not described herein again. Alternatively, the third metal segment 42 is used as a first metal segment of an inductor 20 of the NFC antenna. In this case, a second metal segment 41 is used as the distributed inductor 50. However, regardless of which manner is used, a flow manner of the current does not change, and a loop area of the NFC antenna does not change either. For example, a flow path of the current is: ground→distributed inductor 50→capacitor 10→distributed inductor 50→distributed inductor 50→ground. This path is similar to the current path shown in FIG. 8, and the loop area does not change. Likewise, the second metal segment 41 may be alternatively used as the first radiation branch or the second radiation branch of the first antenna, and the second metal segment 41 is used as the distributed inductor 50 of the NFC antenna. Alternatively, the second metal segment 41 is used as the first radiation branch or the second radiation branch, and the second metal segment 41 is used as a part of the inductor 20 of the NFC antenna. A principle thereof is similar to that in the structure shown in FIG. 7, and details are not described herein again.

Figure 10:
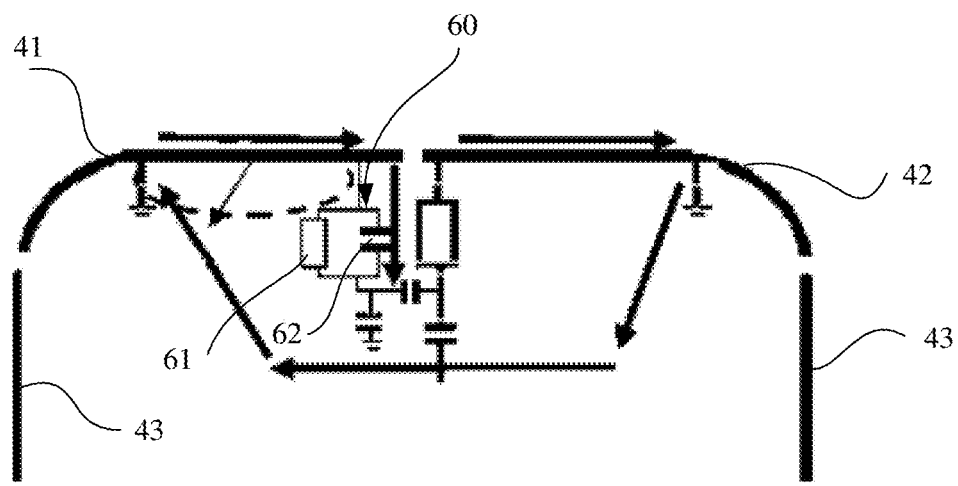
FIG. 10 is a schematic structural diagram of another NFC antenna, in accordance with one or more embodiments.

FIG. 10 shows another NFC antenna. Three gaps are disposed on a metal frame 40 shown in FIG. 10, and divide the metal frame 40 into four metal segments. Two metal segments in the middle are a second metal segment 41 and a third metal segment 42. Two metal segments located on the two sides are fourth metal segments 43. During disposing, the second metal segment 41 and the third metal segment 42 are used as a shared part of a first antenna. In addition, a structure of the NFC antenna in FIG. 10 is similar to the structure of the NFC antenna in FIG. 7, and details are not described herein again. A difference between the NFC antenna in FIG. 10 and the NFC antenna in FIG. 7 is only a difference between second metal segments 41 and a difference between third metal segments 42. As shown in FIG. 7, the second metal segment 41 is a top frame of the metal frame 40, and the third metal segment 42 is a side frame of the metal frame 40. However, in FIG. 10, both the second metal segment 41 and the third metal segment 42 are top frames of the metal frame 40.

It should be understood that the NFC antennas shown in FIG. 6, FIG. 7, FIG. 8, and FIG. 10 merely list examples of several distributed inductors 20. In the embodiments of this application, to improve performance of the NFC antenna and reduce additionally disposed components, any example that can meet the following condition can be used in the embodiments of this application: a part (a segment of metal frame) of an inductor 20 and a first radiation branch are an integrated structure, and a distributed inductor 50 and a second radiation branch are an integrated structure; or a part (a segment of metal frame) of an inductor 20 and a second radiation branch are an integrated structure, and a distributed inductor 50 and a first radiation branch are an integrated structure. Therefore, a structure of a first antenna may be used to increase a loop area of the NFC antenna.

The foregoing descriptions are merely example embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:
1. A mobile terminal, comprising:
a metal frame; and
an NFC antenna, comprising:
  an inductor connected to a first ground point, the inductor comprising:
    a lumped inductor; and
    a segment of the metal frame connected to the lumped inductor in series;
  a capacitor connected to a second ground point and connected in parallel to the inductor;
  a feed; and
  at least two of:
    a first distributed inductor connected in series between the feed and the inductor and connected in parallel to the capacitor;
    a second distributed inductor connected in series between the inductor and the first ground point and connected in parallel to the capacitor;
    a third distributed inductor connected in series between the feed and the capacitor and connected in parallel to the inductor; or
    a fourth distributed inductor connected in series between the capacitor and the second ground point and connected in parallel to the inductor.

2. The mobile terminal according to claim 1, wherein one or more of the first distributed inductor, the second distributed inductor, the third distributed inductor, or the fourth distributed inductor comprises a metal wire on a flexible circuit board, a metal wire on a printed circuit board, or a segment of the metal frame.

3. The mobile terminal according to claim 2, further comprising:
a first antenna comprising a first radiation branch and a second radiation branch;
wherein:
  the segment of the metal frame is a first segment, and the metal frame further comprises a second segment and a third segment;
  the second segment is the first radiation branch of the first antenna;
  the third segment is the second radiation branch of the first antenna; and
  the first segment is a part of the second metal segment or the third metal segment.

4. The mobile terminal according to claim 3, wherein:
the NFC antenna comprises the second distributed inductor;
the first segment is a part of the second segment; and
the second distributed inductor is the metal wire on the flexible circuit board or the metal wire on the printed circuit board connected to the first radiation branch in series.

5. The mobile terminal according to claim 3, wherein:
the NFC antenna comprises the fourth distributed inductor;
the first segment is a part of the second segment; and
the fourth distributed inductor is a part of the third segment.

6. The mobile terminal according to any claim 5, wherein the NFC antenna comprises the fourth distributed inductor, the mobile terminal further comprising:
a selection circuit comprising a low-cut filter and a high-cut filter connected in parallel;
wherein:
  a first end of the low-cut filter and a first end of the high-cut filter are connected to the capacitor; and
  a second end of the low-cut filter and a second end of the high-cut filter are connected to the fourth distributed inductor.

7. The mobile terminal according to claim 6, wherein the high-cut filter is another inductor, and the low-cut filter is another capacitor.

8. The mobile terminal according to claim 3, wherein:
the NFC antenna comprises the fourth distributed inductor;
the first segment is a part of the third segment; and
the fourth distributed inductor is a part of the second segment.

9. The mobile terminal according to claim 3, wherein:
the NFC antenna comprises two fourth distributed inductors;
the first segment is a part of the second segment;
a first fourth distributed inductor of the two fourth distributed inductors is a part of the third segment;
a second fourth distributed inductor of the two fourth distributed inductors is connected to the second ground point; and
the second fourth distributed inductor of the two fourth distributed inductors is the metal wire on the flexible circuit board or the metal wire on the printed circuit board that is connected to the third segment in series.

10. A mobile terminal, comprising:
a metal frame comprising a first segment, a second segment, and a third segment;
a first antenna comprising a first radiation branch and a second radiation branch, wherein the second segment is the first radiation branch, and the third segment is the second radiation branch; and
an NFC antenna comprising:
  an inductor comprising a lumped inductor connected in series to the first segment;
  a first distributed inductor;
  a second distributed inductor;
  a capacitor connected in parallel to the inductor; and
  a feed connected to the inductor and the capacitor;

wherein:
  the inductor is connected to a first ground point;
  the capacitor is connected to ground through a second ground point;
  the first segment is a part of the second segment;
  the first distributed inductor is connected in series between the lumped inductor and the first ground point;
  the first distributed inductor is a part of the second segment;
  the second distributed inductor is connected in series between the capacitor and the second ground point; and
  the second distributed inductor is a part of the third segment.

11. A mobile terminal, comprising:
a metal frame comprising a first segment, a second segment, and a third segment;
a first antenna comprising a first radiation branch and a second radiation branch, wherein the second segment is the first radiation branch, and the third segment is the second radiation branch; and
an NFC antenna comprising:
  an inductor comprising a lumped inductor connected in series to the third segment;
  a first distributed inductor;
  a second distributed inductor;
  a capacitor connected in parallel to the inductor;
  a selection circuit, comprising a low-cut filter and a high-cut filter that are connected in parallel; and
  a feed connected to the inductor and the capacitor;
wherein:
  the inductor is connected to a first ground point;
  the capacitor is connected to ground through a second ground point;
  the first segment is a part of the second segment;
  the first distributed inductor is connected in series between the selection circuit and the second distribution inductor;
  the second distributed inductor is connected between the first distributed inductor and the second ground point; and
  the first distributed inductor is a part of the second segment;
  the low-cut filter and the high-cut filter are both connected to the capacitor; and
  the low-cut filter and the high-cut filter are both connected to the first distributed inductor.

* * * * *